United States Patent
Patil et al.

(10) Patent No.: US 12,461,784 B2
(45) Date of Patent: Nov. 4, 2025

(54) CLOUD DATA MIGRATION USING MACHINE LEARNING PREDICTION MODELS

(71) Applicant: Accenture Global Solutions Limited, Dublin (IE)

(72) Inventors: Hemant Chandrakant Patil, Pune (IN); Sarang Padmakar Joshi, Pune (IN); Mihir S. Nanal, Pune (IN); Pradnya Desai, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 430 days.

(21) Appl. No.: 18/300,676

(22) Filed: Apr. 14, 2023

(65) Prior Publication Data

US 2024/0345887 A1     Oct. 17, 2024

(51) Int. Cl.
*G06F 9/50* (2006.01)

(52) U.S. Cl.
CPC .......... *G06F 9/5038* (2013.01); *G06F 9/5072* (2013.01); *G06F 2209/501* (2013.01); *G06F 2209/5019* (2013.01)

(58) Field of Classification Search
CPC .................. G06F 9/5038; G06F 9/5072; G06F 2209/501; G06F 2209/5019; G06F 16/214
See application file for complete search history.

(56) References Cited

U.S. PATENT DOCUMENTS

| | | | |
|---|---|---|---|
| 9,442,694 B1* | 9/2016 | Boehme | G06F 7/36 |
| 2017/0124129 A1* | 5/2017 | Chen | G06F 16/2228 |
| 2018/0052620 A1* | 2/2018 | Driesen | G06F 3/0617 |
| 2018/0074748 A1* | 3/2018 | Makin | G06F 9/4856 |
| 2023/0306306 A1* | 9/2023 | Katoh | G06N 20/00 |
| 2023/0350915 A1* | 11/2023 | Ranjan | G06F 16/214 |
| 2025/0054584 A1* | 2/2025 | Sakai | G16C 20/70 |
| 2025/0110971 A1* | 4/2025 | Haji Soleimani | G06F 16/285 |
| 2025/0150404 A1* | 5/2025 | Thomas | H04L 43/16 |

FOREIGN PATENT DOCUMENTS

WO     2018048628 A1     3/2018

OTHER PUBLICATIONS

European Search Report for Application No. 24166536.3 dated Sep. 10, 2024, 9 Pages.
Anonymous, "Oracle11g—what is skewed column in Oracle—Stack Overflow", Feb. 19, 2016, 2 pages. <https://stackoverflow.com/questions/35509868/what-is-skewed-column-in-oracle>.

* cited by examiner

*Primary Examiner* — Benjamin C Wu
(74) *Attorney, Agent, or Firm* — Mannava & Kang, P.C.

(57) ABSTRACT

An automated machine learning-based system and method of managing content for data migrations. The system can process bulk tabular datasets and real-time legacy application parameters. The data can then be segmented into segments based on an estimated time for execution of the data migration for the given dataset generated by a machine learning model. In some embodiments, the system can automatically generate a code that can perform the data migration based on the proposed segment segmentation. The proposed embodiments are effective in reducing downtime during migrations as well as limiting the impact of failure events on the process.

20 Claims, 8 Drawing Sheets

| INPUT | | | OUTPUT | |
|---|---|---|---|---|
| THROUGHPUT | CHECKPOINT_DURATION | TABLE_SIZE | TOTAL_RECORD | TOTAL | SEGMENT_SIZE |

DECIDE THE SEGMENT SIZE — 520
710 (INPUT), 720 (OUTPUT)

FIG. 7

| INPUT | | OUTPUT |
|---|---|---|
| SEGMENTATION COLUMN | TABLE METADATA INFO | PII INFO | JSON FILE |

GENERATE JSON FOR CDAP — 530
810 (INPUT), 820 (OUTPUT)

FIG. 8

CLOUD DATA MIGRATION USING MACHINE LEARNING PREDICTION MODELS

TECHNICAL FIELD

The present disclosure generally relates to data migration resource management, and more particularly to providing intelligent utilization recommendations of available resources and execution times during a data migration.

BACKGROUND

Enterprises conduct operations using enterprise networks that include a broad array of assets (e.g., components such as computing assets and computer-implemented assets). Enterprise networks can be provided in on-premise platforms and/or cloud-computing platforms. In an on-premise platform, assets are operated, managed, and controlled by the enterprise. For example, assets can include servers and software programs that are directly owned and managed by the enterprise. In a cloud-computing platform, a third-party service provider operates, manages, and controls assets on behalf of enterprises.

However, cloud computing has seen increasing use for a variety of reasons, including cost savings, ease of maintenance, scalability, and versatility. Cloud computing provides many different types of cloud applications, such as information as a service (IaaS) applications (e.g., information technology applications, networking applications, data storage applications, etc.), platform as a service (PaaS) applications (e.g., hardware applications, operating system applications, etc.), and software as a service (SaaS) applications (e.g., email applications, word processing applications, image applications, etc.). Thus, there is many strong motivations to migrate between types of platforms. Migration from an on-premise platform to a cloud-computing platform enables enterprises to quickly respond to growing or fluctuating resource demands, thereby enhancing agility, reducing capital expenditures, increasing employee and stakeholder collaboration, and improving security and compliance. In some instances, enterprises migrate from one cloud-based platform to another cloud-based platform. For example, an enterprise can migrate its operations (or at least a portion thereof) from a first cloud-computing platform to a second cloud-computing platform in an effort to attain efficiencies, reduce costs, and/or improve performance, among other reasons.

While it has been increasingly desirable to move application maintenance from its traditional arrangement (often called a legacy application) or a different cloud computing platform, to a new, cloud-based application, such migrations depend on incorporation of new hardware and software. For example, cloud applications have several attributes that make them different than typical software applications. In some cases, cloud applications execute on virtualized hardware and a software stack that can be moved and replicated between physical machines as needed, share common physical resources with other cloud applications, are built to be highly scalable in real-time, and are predominately accessed using standard network protocols. Furthermore, cloud applications use hypertext markup language (HTML) and other web technologies for providing front-end and management user interfaces, provide application programming interfaces (APIs) for integration and management, consume third-party APIs for providing common services and functionality, and tend to use no structured query language (SQL) data stores.

As a result, migrating an enterprise network from an on-premise platform to a cloud-based platform has typically represented a manual and effort-intensive process. This also includes expenditure of technical resources (e.g., processors, memory, bandwidth). There are various objectives and concerns that affect the decisions regarding choosing a particular cloud provider (or a particular mix of cloud providers) over others and which available locations of the same to prefer over the others, as well as the time needed to perform the data migration. Thus, as cloud computing technologies become more ubiquitous, enterprises are confronted with a growing number of complexities regarding how to best migrate existing computing resources to the cloud. It is therefore highly desirable to provide mechanisms that can facilitate the data migration to reduce disruptions to operations, allow for more accurate cost predictions, and limit migration failure events.

There is a need in the art for a system and method that addresses the shortcomings discussed above.

SUMMARY

The proposed systems and methods describe an automated machine learning-based system and method of managing content for data migrations. The system can process bulk tabular datasets and real-time legacy application parameters. The data can then be divided into segments based on an estimated time for execution of the data migration for the given dataset generated by a machine learning model. In some embodiments, the system can automatically generate a code that can perform the data migration based on the proposed segmentation. The proposed embodiments are effective in reducing downtime during migrations as well as limiting the impact of failure events on the process. These features (among others described) are specific improvements in way that the underlying computer system operates. In addition, the proposed systems and methods solve technical challenges with software development targeted for transformation. The improvements facilitate a more efficient, accurate, consistent, and precise building of resources that can be utilized during the data migration by crafting the process based on an intelligently estimated time of execution of the migration. The improved functioning of the underlying computer hardware itself achieves further technical benefits. For example, the system avoids tedious and resource-draining data transfer cycles that must be completely restarted when a failure event occurs by instead moving the data in segments through the pipeline. The system thereby accelerates the timeline for successful completion of a system's cloud migration, and reduces operational downtime, therefore increasing infrastructure instantiation efficiency and reduces wait times for cloud application setup and execution.

In one aspect, the disclosure provides a computer implemented a method of managing content during data migration. The method includes a first step of receiving, at a prediction machine learning (ML) model, a first dataset including real-time system parameters for a legacy application, where the first dataset includes tabular data, and a second step of determining, at the prediction ML model and based on sampled process times, an estimated time for execution of the data migration of the first dataset. A third step includes determining, based on the estimated time and a given checkpoint duration, an estimated number of segments into which the first dataset can be segmented, where a segment refers to a discrete segment of the first dataset expected to migrate during the given checkpoint duration. In addition, a fourth step includes determining, based on the number of segments, an estimated segment size for each segment, and a fifth step includes determining a degree of data skew for each column. Furthermore, the method includes a sixth step of selecting a first column associated with the smallest data skew as a segmentation column, a seventh step of automatically generating a code that describes the estimated number of segments, the estimated segment size, and the selected first column, and an eighth step of executing the data migration of the first dataset based on the generated code.

In another aspect, the disclosure provides a non-transitory computer-readable medium storing software comprising instructions executable by one or more computers which, upon such execution, cause the one or more computers to manage content during data migration by the following operations: (1) receive, at a prediction machine learning (ML) model, a first dataset including real-time system parameters for a legacy application, the first dataset including tabular data; (2) determine, at the prediction ML model and based on sampled process times, an estimated time for execution of the data migration of the first dataset; (3) determine, based on the estimated time and a given checkpoint duration, an estimated number of segments into which the first dataset can be segmented, wherein a segment refers to a discrete segment of the first dataset expected to migrate during the given checkpoint duration; (4) determine, based on the number of segments, an estimated segment size for each segment; (5) determine a degree of data skew for each column; (6) select a first column associated with the smallest data skew as a segmentation column; (7) automatically generate a code that describes the estimated number of segments, the estimated segment size, and the selected first column; and (8) execute the data migration of the first dataset based on the generated code.

In yet another aspect, the disclosure provides a system for managing content during data migration, the system comprising one or more computers and one or more storage devices storing instructions that may be operable, when executed by the one or more computers, to cause the one or more computers to: (1) receive, at a prediction machine learning (ML) model, a first dataset including real-time system parameters for a legacy application, the first dataset including tabular data; (2) determine, at the prediction ML model and based on sampled process times, an estimated time for execution of the data migration of the first dataset; (3) determine, based on the estimated time and a given checkpoint duration, an estimated number of segments into which the first dataset can be segmented, wherein a segment refers to a discrete segment of the first dataset expected to migrate during the given checkpoint duration; (4) determine, based on the number of segments, an estimated segment size for each segment; (5) determine a degree of data skew for each column; (6) select a first column associated with the smallest data skew as a segmentation column; (7) automatically generate a code that describes the estimated number of segments, the estimated segment size, and the selected first column; and (8) execute the data migration of the first dataset based on the generated code.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a schematic diagram showing an example of an input and output during a segment size determination step, according to an embodiment;

FIG. 8 is a schematic diagram showing an example of an input and output during generation of a migration configuration, according to an embodiment;

DESCRIPTION OF EMBODIMENTS

Generally, cloud computing refers to the deployment and use of computer technology over the Internet, where computing resources from a larger collection of shared computing resources can be dynamically requisitioned as a service over the Internet. Cloud computing is distinguished from other similar computing paradigms—such as utility computing—in that cloud computing consumers need not have (and are generally precluded from) knowledge of, visibility in, and control over the actual technology infrastructure used to provide the obtained service. The majority of current cloud computing infrastructures consist of numerous servers with varying levels of virtualization technologies. Architecturally, cloud computing data center networks can resemble traditional enterprise architectures, albeit on a larger scale. For example, the architecture for a typical data center network for any particular cloud computing vendor may be implemented as a hierarchy of routers and concentric subnets connecting a large network of servers, often numbering in the hundreds or thousands.

However, the prohibitive cost of building and maintaining even a modest sized network, and the inherent characteristics of hierarchical network architectures, have continued to burden data migrations. Furthermore, traditional data migration has involved a great deal of unpredictability and failed efforts. For example, migrations rely on an extensive pipeline execution for large data tables, as well as recurring timeout or blocking issues from the source database management system (DBMS) and minimal control over the data transfer process. In some cases, a single data table for the legacy application can include terabytes or petabytes of data, which represents a huge volume of data. With conventional data transfer paradigms, the extraction and transfer of each of these data tables is run across a single pipeline, and can involve several days to a week or more of work. At each point in which a failure occurs, there is a substantial loss of time and data, requiring extensive monitoring efforts required for every single large table. In other words, if there is any fail event during the transfer of a single table, all data that had been moved through the pipeline is lost, and the entire data transfer process for that specific table must be restarted. The defects or other issues that led to the failure must then be addressed before restarting, leading to timeouts and blocking issues. Finally, table data transfers have very little options for adjusting how the transfer is meant to occur, adding to the inefficiency of the process. Traditional data transfer can therefore be associated with recurring disrupted operation planning, and overrun of budget and resources.

Figure 1:
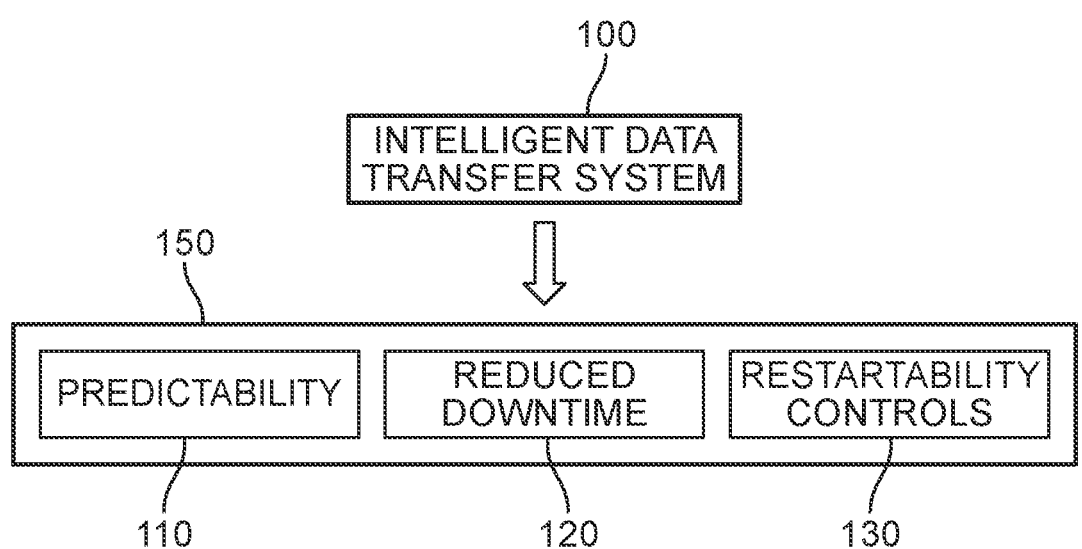
FIG. 1 is an overview presenting some benefits of an embodiment of the data migration content management system.

The proposed systems and methods are directed to intelligent cloud data migration by artificial intelligence (AI)-based predictive segmentation of tabular data that address these and other challenges of cloud computing transformations. For purposes of introduction, some advantages 150 of an intelligent data transfer system 100 (or system 100, also referred to herein as a data migration content management system) are presented in FIG. 1. In one embodiment, the proposed embodiments enable predictability 110 and optimization of tabular data (e.g., data tables) during data migration, including bulk data migrations. In different embodiments, predictability of the data migration execution as a whole can then be increased many folds due to the known time of execution. Furthermore, predictability minimizes the number of restarts required due to the transfer of only small data segments rather than an entire data entity (e.g., a massive data table), mitigating the impact of a single point of failure. Predictability further enables a more optimized use of existing resources to give maximum and stable throughput during migration. In some embodiments, the system can evaluate the legacy and proposed components comprising the migration ecosystem, including on-prem sources, cloud environment, and the execution platform. In one embodiment, the system offers predictability 110 by use of machine learning (ML) techniques that analyze sources, targets, execution environments, databases, networks, metadata, etc. Based on this information, the system can recommend specific segmentation columns and optimal segment size. In some embodiments, the system can predict the execution time for different combinations.

In different embodiments, such predictions can be generated before execution of the migration, enabling a minimal impact on the system's resources and source DBMS, thereby significantly reducing the likelihood and frequency of any downtime 120. Additionally, as will be described below, the system is designed to solve the technical problems of restartability and uncertainty during execution of the data migration by providing more control 130 prior to and throughout the migration process, leading to faster adaptability for complying to real time decisions during migration. In one embodiment, multiple configurations can be identified and presented by the recommendation model for selection. These intelligent predictions can also reduce the likelihood of failures, the frequency of restarts, the time lost to these undesirable events, and accelerates the overall time needed for migration, ultimately allowing for more accurate cost and time estimations in terms of cloud billing.

Figure 2:
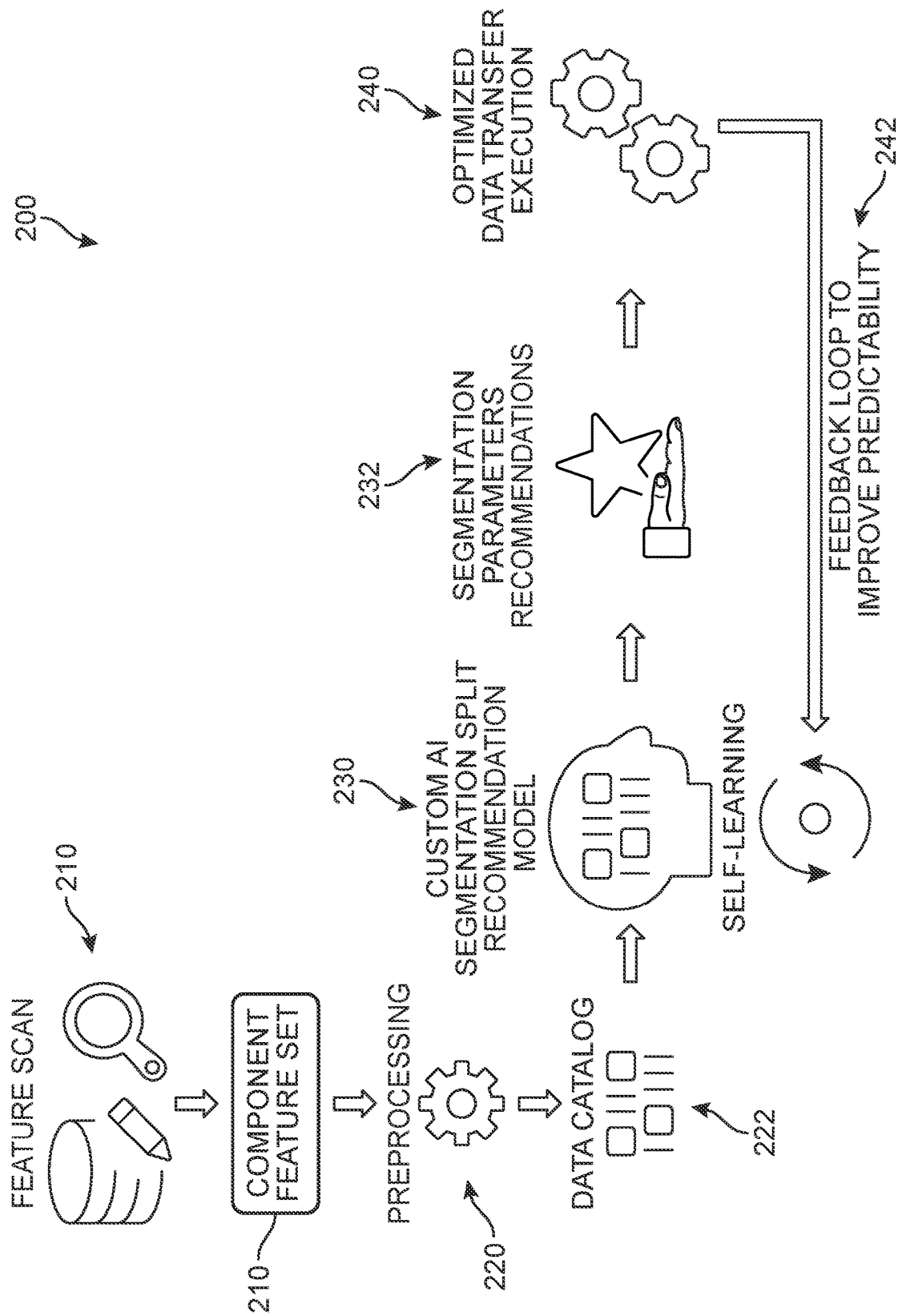
FIG. 2 is a high-level view of a technical architecture for a data migration content management, according to an embodiment.

Referring now to FIG. 2, a high-level view of an embodiment of a flow through a technical architecture 200 ("architecture") 200 for data transfers during a migration is shown. As a general matter, the proposed systems can provide data-generation for migrations across a variety of cloud platforms. Some examples include but are not limited to AWS®, Azure®, GCP®, Oracle®, and others. In addition, embodiments of the proposed system can be built using a wide range of programming languages, including but not limited to Python, Go, Ruby, Java or C.Net.

In FIG. 2, the system initially performs a feature scan in a first stage 210. For example, a feature scanning module can implement a custom program to analyze and extract features from the inputs, which can include the source system information, target system, and metadata. As a general matter, metadata can refer to data that describe the properties or characteristics of end-user data and the context of those data. In some embodiments, a first output 212 of the first stage 210 can include metrics represented in a component feature set. These metrics can be used by the system to predict the data transfer execution time for each data table prior to the migration, as well as estimate segment size and segmentation fields. In some embodiments, the feature scanning module can use feature engineering techniques such as feature creation, transformations, feature extraction, and feature selection, to prepare the data for consumption by the system's ML model (see third stage 230). As other non-limiting examples, techniques such as imputation, discretization, categorical encoding, feature splitting, handling outliers, variable transformations, scaling, and other can also be used.

In different embodiments, the first output 212 moves into a preprocessing module of a second stage 220 that performs preprocessing of the feature set. For example, during this stage, the metrics of first output 212 can be converted into a machine learning (ML) consumable format, such as but not limited to a JSON, CSV, YAML, Excel®, or other data file format. In this case, a second output 222 of the preprocessing is a data catalog of the metadata of the extracted features. The second output 222 can then be passed to an ML segmentation split recommendation model ("recommendation ML model" or "prediction ML model") in a third stage 230, additional details of which will be provided with reference to FIGS. 3-7 below.

As noted earlier, the conventional transfer of large data tables in a single unbroken process has been associated with many disadvantages. The proposed machine learning model can provide an intelligent approach to segmentation (or "chunking") of each data table. For example, breaking the table into smaller segments (also referred to as "chunks") can allow the process to follow a more incremental, predictable, and structured path that greatly diminishes the impact of failures occurring in the pipeline. In other words, when a failure occurs with respect to the transfer of a single table segment, the previous segments are unaffected and may be understood to have migrated successfully, and only the smaller portion of data of the table segment need be restarted.

In some embodiments, the recommendation ML model can predict the data transfer execution time for each data entity, a recommended/optimal segment size (e.g., how many records in a single segment), and the recommended segmentation fields (which columns to involve in the segmentation) that will best protect the integrity of the data, based on metadata and infrastructure parameters. As a general matter, the term "segment" or "data segment" is used to describe a unit or fragment of information or a collection of related data which is sent to a processor or one of the parts of a computer for processing. In some examples, each segment can contain a header which indicates some parameters. Following the header is a variable area containing data, which is decoded by the program from the parameters in the header.

In different embodiments, the recommendation ML model then outputs the recommended segment size, the segmentation field, and predicted time for migration. In this case, a third output 232 from the third stage 230 based on the ML model's operation is represented as segmentation parameters recommendations. These recommendations are passed to an optimized data transfer module in a fourth stage 240. The optimized data transfer module determines the optimal configuration of both the segment size and segmentation field and feeds it to an orchestrator (not shown in FIG. 2). In some embodiments, the data transfer execution can further include automatic generation of code and configurations based on the extracted metadata, which can be used by the orchestrator for execution of the data migration. The process of fourth stage 240 can involve splitting of the migration data entity into recommended segments and then automatically running these split portions (data segments) continuously until all the data is migrated, thereby increasing the predictability of the migration. Furthermore, in different embodiments, the results of the split and sequence of data transfer runs can be assessed and feedback 242 from reviewers or other testers can be sent back to the recommendation ML model to iteratively (e.g., with each round of feedback) improve the accuracy of the ML model predictions (e.g., providing a continuous feedback loop) by self-learning.

Figure 3:
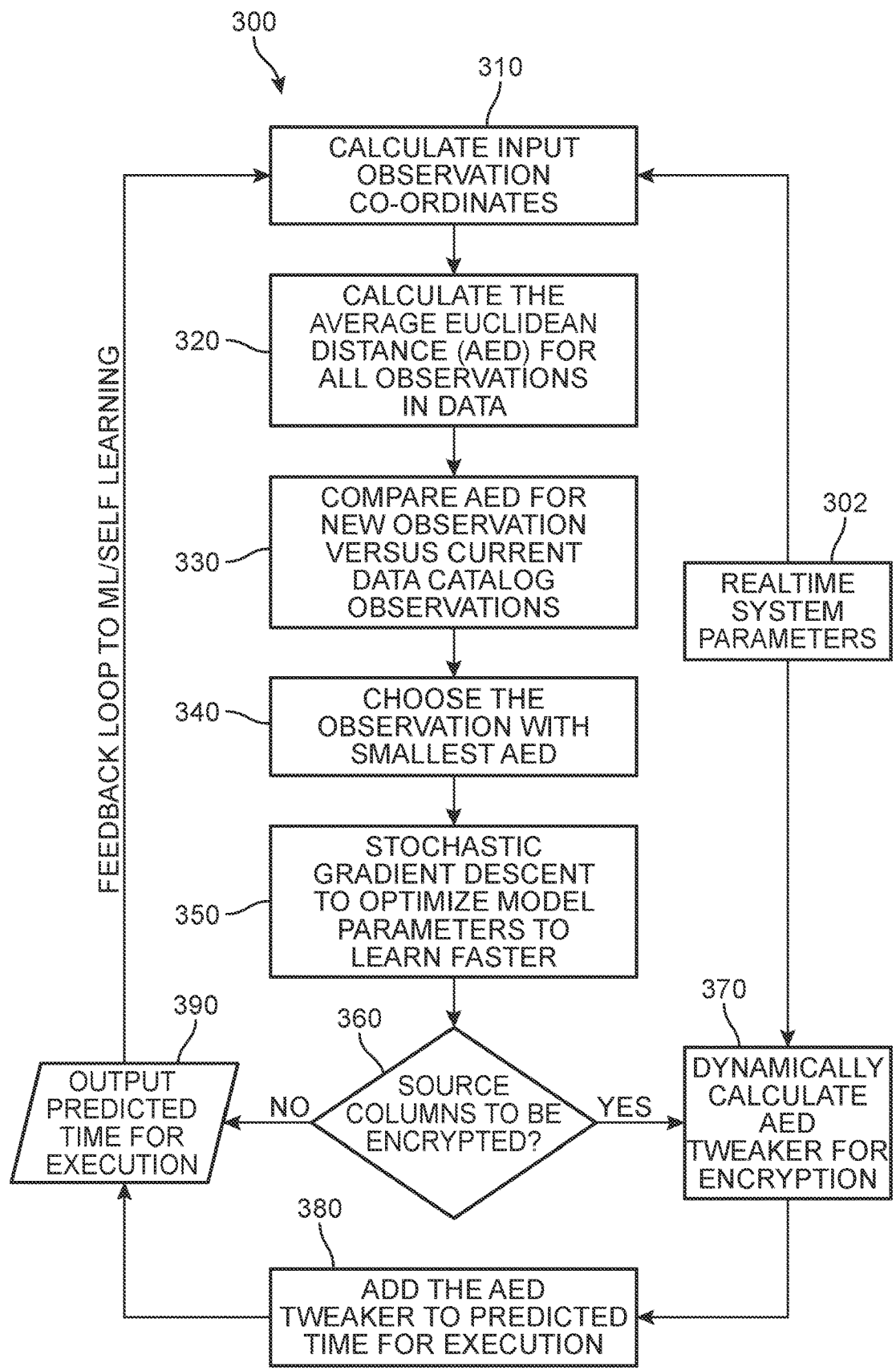
FIG. 3 is a schematic flow diagram of a process for predicting an estimated time for execution (execution time) of a data migration, according to an embodiment.

Additional details regarding the recommendation ML model are now provided by way of a schematic flow diagram in FIG. 3. The flow diagram depicts an embodiment of a process 300 by which the recommendation ML model generates predictions. In a first operation 310, the recommendation ML model receives real-time system parameters 302 and the data catalog (see FIG. 2) for ingestion and calculates input observation co-ordinates. For purposes of this application, an observation can refer to one data sample taken from a data migration pipeline execution (e.g., to migrate a specific table to Google Cloud Platform's Big Query® or other available multi-cloud data warehouses for database management and analysis, such as but not limited to MongoDB Atlas®, Oracle Database®, Amazon Redshift®, InterSystems Cache®, DataStax Enterprise®, Db2®, CDP Data Hub®, and Couchbase Server®, etc.).

At a second operation 320, the model can loop through the data catalog matrix and calculate the Average Euclidean Distance (AED) for all observations. The AED in this case can be understood to refer to the average of the Euclidean Distances between each of the observations. In a third operation 330, the AED for the new observation can be compared to the ED for the current data catalog samples. A fourth operation 340 can include selecting the observation with the closest or smallest AED. In some embodiments, at a fifth operation 350, a stochastic gradient descent technique may be used to optimize the model parameters and accelerate model learning. At a sixth operation 360, the model determines whether source columns should be encrypted. In some embodiments, in cases where source columns do need to be encrypted, the time increase due to encryption may also be affected (e.g., encrypted columns can require additional processing time in the data transfer relative to non-encrypted columns). This can trigger an optional seventh operation 370 in which the prediction algorithm is enhanced or modified by the additional calculation of a dynamic encryption factor (δ) ("AED tweaker") by which the processing time will increase using real-time system parameters, based on the formula of Equation (1) below.

$$\delta = \frac{\alpha}{100} \times \eta \qquad \text{Equation (1)}$$

where:
ε is the number of encrypted cols,
α is the time for encrypted columns which is calculated in proportion to total time required for all columns,
θ is the total number of Columns,
η is the Encryption Factor (ε/θ), and
δ=AED Tweaker, i.e., increase in prediction time due to encryption.

If the AED tweaker is deemed necessary, the factor can be added to the predicted time for execution in an eighth operation 380. The model can then generate the predicted time for execution (with or with the AED tweaker) at a ninth operation 390. In some embodiments, the output can also be subject to review, feedback from which can be returned to the model to promote performance accuracy and self-learning.

Figure 4:
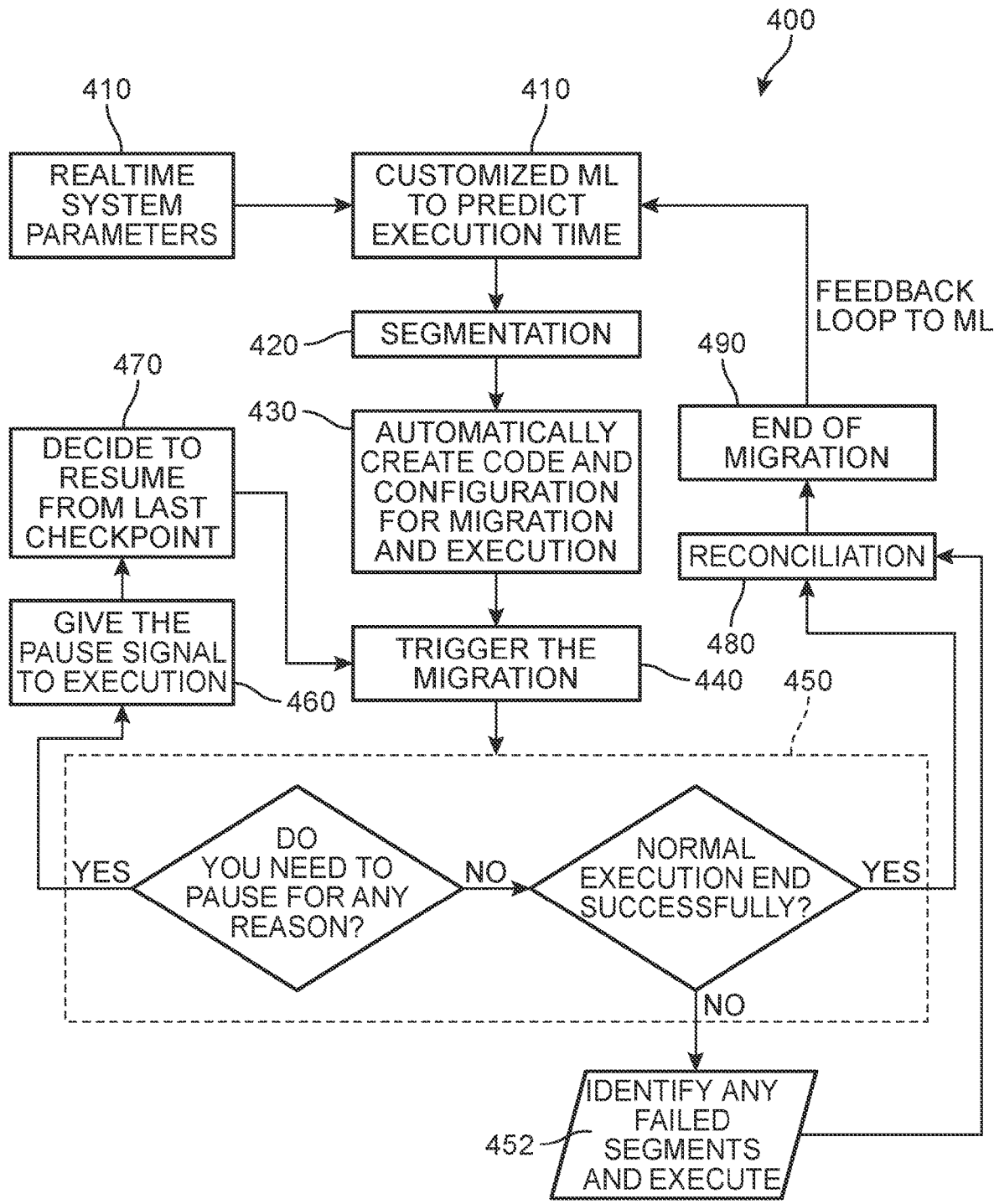
FIG. 4 is a schematic flow diagram of a process for intelligent segmentation of bulk tabular data for data migration, according to an embodiment.

A schematic flow diagram showing an embodiment of a system framework ("system") 400 for data migration providing customized table segmentation based on real-time system parameters is presented in FIG. 4. In a first stage 410, the system 400 receives real-time system parameters 402 and implements the recommendation ML model to predict data migration time. In a second stage 420, the recommendation ML model is used to intelligently identify the manner in which the data entity can be segmented to enhance migration and enable uncomplicated pausing. For example, the model can calculate the optimal number of segments into which the data entity can be divided, the size of each segment, and the best column(s) where segmentation can occur. In a third stage 430, the system 100 can automatically generate code and configuration data for execution of the proposed data migration of all of the table segments. The migration can be triggered at a fourth stage 440, which may be performed for each data segment in a fifth stage 450. If migration is executed without issue and completes successfully, an eighth stage 480 directed to data reconciliation can occur. If migration involved any failed segments, these can be independently re-executed in a restart operation 452 before moving to the eighth stage 480. Migration is complete (ninth stage 490) after reconciliation. In some embodiments, feedback can be shared with the recommendation ML model to reinforce or otherwise improve its performance.

As noted earlier, the proposed embodiments can also include finer restartability controls. In different embodiments, for example, there may arise a need to pause migration processes mid-transfer. For example, a problem with the migration may be detected, such as a high load on the source side of the migration may be detected. If such an instance occurs, the system can permit input of a pause command or pause signal, which will halt the execution, in a sixth stage 460. Once the issue has been resolved or the user otherwise determines the process can continue, a restart control can be activated. The restart, rather than take place from the very beginning of the pipeline, will instead advantageously occur from a most recent checkpoint. Checkpoints can be understood to refer to specific points during the transfer of each data segment in which an additional layer of protection can be created. The checkpoints represent a completion point of the transfer of a sub-segment of data from the larger segment (segment), and allow for inter-segment pauses. In other words, not only do users no longer need to dread the loss of several days worth of data migration, but even the transfers of the smaller portions (sub-segments) can be saved, minimizing any data loss in the event of a failed segment.

Figure 5:
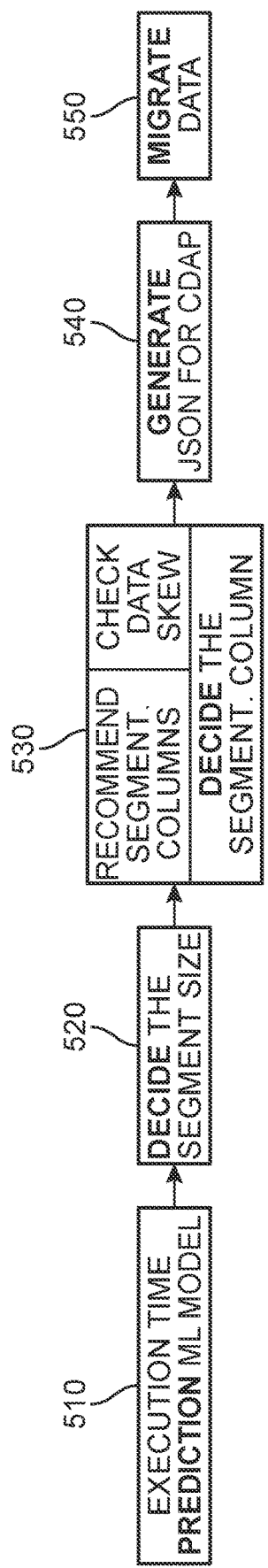
FIG. 5 is a schematic flow diagram of an embodiment of a segmentation process, according to an embodiment.

For purposes of clarity, aspects of the segmentation process are now discussed. In FIG. 5, a high-level overview of an embodiment of a segmentation process 500 is shown. In this example, it can be seen that the segmentation process 500 can involve a sequence of steps including: (a) a first step 510 in which the recommendation ML model can be used to generate a prediction for execution time in a first step 510; (b) a second step 520 in which the segment size is determined; (c) a third step 530 in which segmentation columns are determined; (d) a fourth step 540 in which the data describing the segmentation structure is outputted in the desired format; and (e) the data is migrated in accordance to the selected segmentation structure. Additional details regarding the first step 510, second step 520, third step 530, and fourth step 540 is now provided with reference to FIGS. 6, 7, and 8.

Figure 6:
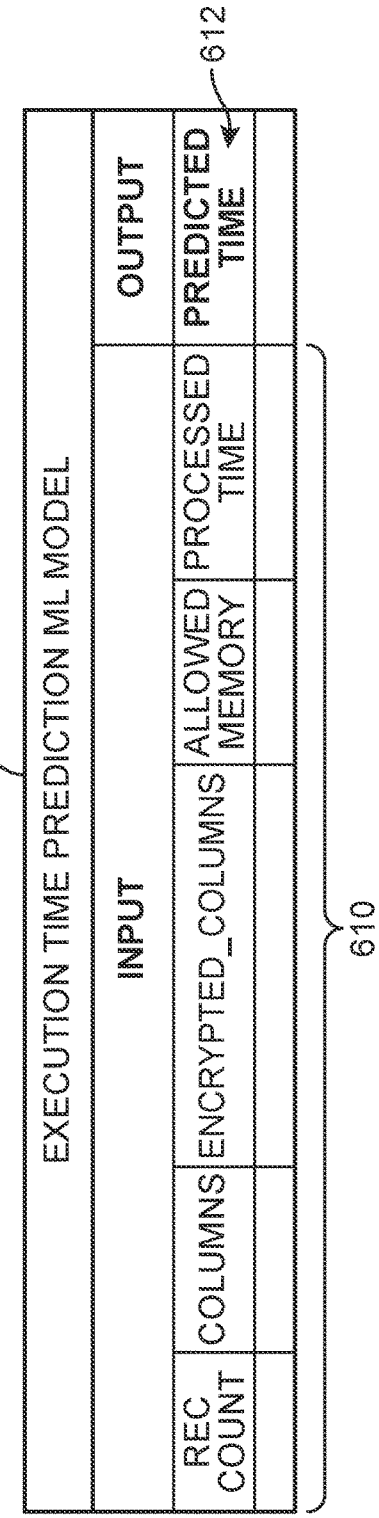
FIG. 6 is a schematic diagram showing an example of an input and output of a prediction machine learning model for execution times, according to an embodiment.

Referring first to FIG. 6, the predicted execution time can be obtained. For example, in some embodiments, a series of dry runs are executed on sample tables (training data). Each sample table 610 can present different configurations of variables including features of the data table such as rec count (e.g., the different record counts), columns, encrypted_columns (e.g., the number of encrypted columns in the table), and allowed memory or processing power, which is used to derive a sample's processed time. Based on the samples' processed times, the model is trained to predict execution times 612 for the actual provided configurations.

In FIG. 7, the system uses the predicted execution times 612 to determine the segment size of and number of segments. In some embodiments, a second input 710 including throughput, checkpoint duration, table size, and total number of records is received. In some embodiments, the optimal number of segments that will be recommended to divide the data into can be based on Total_Segments=(Predicted Time/Desired Checkpoint Duration). As a default, the checkpoint duration may be two hours, or some other period that represents a unit of time over which migration of one segment will be transferred, such that failure of that batch will result in a restart or rerun of that segment only. In other embodiments, the checkpoint duration can be modified per the user's requirements. Furthermore, in different embodiments, the size of each segment can be estimated based on the recommended total number of segments, based on Segment_Size=(Total Records/Total Segments). The total segments and segment size can represent a second output 720 of the second step 520.

In FIG. 8, the system can use the segment size and total segment number to determine what the optimal segmentation column can be (e.g., where the split between two segments of the table can occur) as part of the third step 530. For example, in some embodiments, the system can evaluate the labels/names of columns in the data entity (e.g., segmentation column name, such as data type-integer, dates, timestamps, etc.), table metadata information, and Personal Identifiable Information (PII) that may be associated with the data as a third input 810. The system can then identify each column's data skewness (or simply, data skew), and determine which is the most appropriate column at which the separation can occur based on which column(s) is associated with the smallest skew. This allows for selection of the column that promotes a more even distribution of the data. Generally, data skew refers to when data is not evenly distributed across partitions/columns and so the table's data is unevenly balanced among partitions. An even distribution of data across all columns and rows or other partitions is a primary objective when distributing and managing data. In some embodiments, calculating skewness may involve considering integer columns. For example, nullable columns may be excluded from consideration. In some embodiments, data distribution may be derived by generating a SQL statement and deriving the distribution. In some embodiments, data distribution may be derived using a program (e.g., a Python program) that generates the SQL statement and derives the distribution. The column having uniform data distribution (i.e., lowest skewness) may be selected.

In some embodiments, the system can then generate a third output 820 including (a) the estimated time, (b) the selected segment size, and (c) the selected column. In different embodiments, the output is generated in a JSON, CSV, YAML, Excel®, or other such structured data file format. As noted in FIG. 5, the system can then generate a migration configuration based on the third output 820, which will serve as input for orchestration via an orchestrator such as Airflow®, or other available workflow automation tools such as Luigi®, NiFi®, AWS Step Functions®, Prefect®, Dagster®, Kedro®, and Oozie®, among others. The migration configuration can include automatically generated code (e.g., SQL code) that is to be executed for each table/segment, called later in orchestration. In some embodiments, the orchestrator can automatically execute the data transfer based on the output.

As described herein, the proposed embodiments enable the intelligent management of content during data migration. In one example, the system can identify an optimal use of processing and memory resources to be employed during the migration that reduces overutilization and underutilization to achieve a high-performance transfer of data customized to each client's available resources and data volume. In some embodiments, the system offers a framework that supports data migration across any cloud-computing platform. In one example, the system prepares the bulk data before migration into segments that can be transferred individually, and minimize the loss of time, resources, and data in the event of a defect or other failure. Furthermore, the system offers users the ability to more finely control the migration process itself by enabling a pause/resume option that facilitates migration restartability with little to no detrimental effect to the overall transformation.

Figure 9:
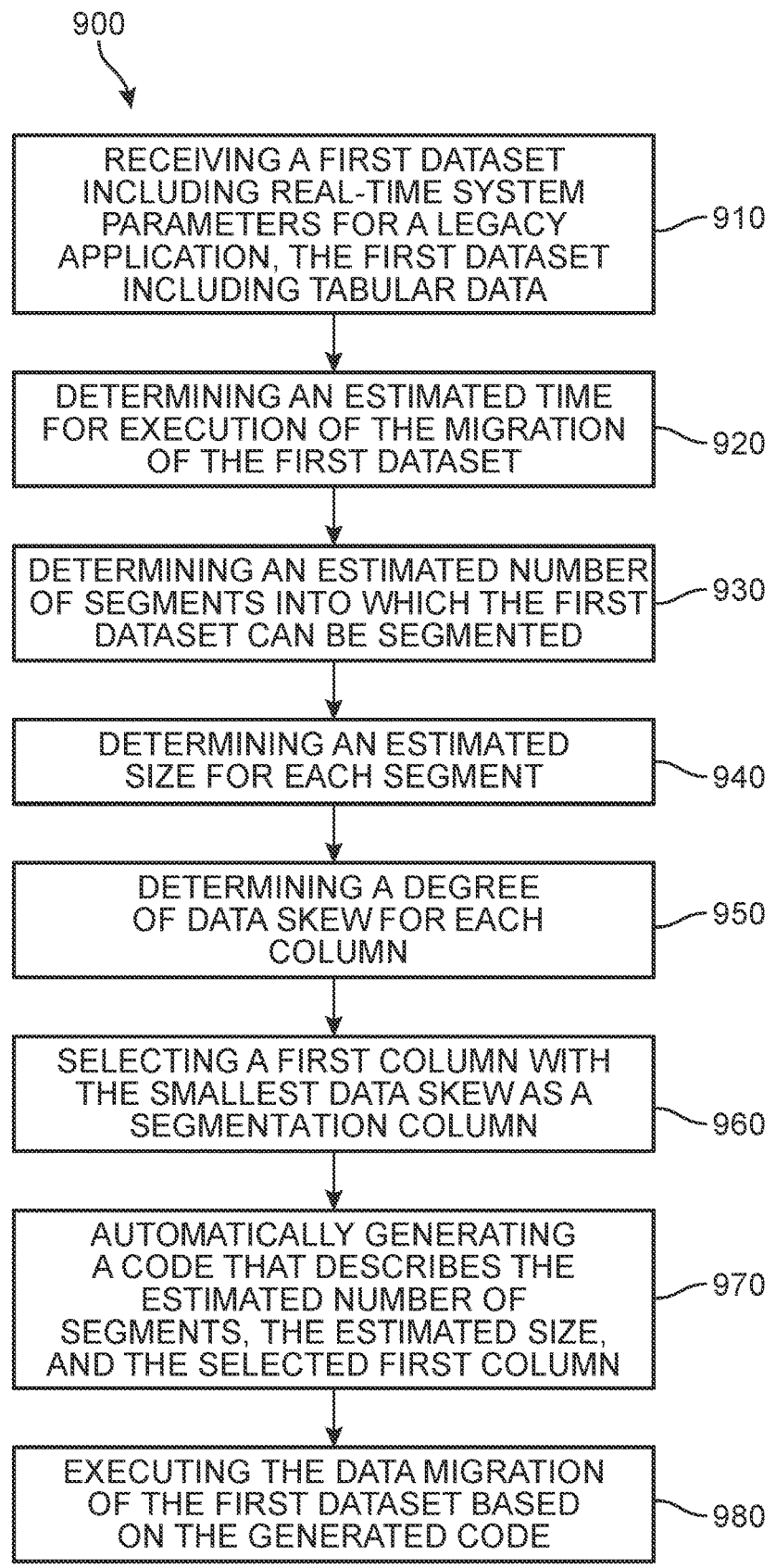
FIG. 9 is a flow chart depicting a method of managing content during data migration, according to an embodiment.

FIG. 9 is a flow chart illustrating an embodiment of a method 900 of producing enriched test data. The method 900 includes a first step 910 of receiving, at a prediction machine learning (ML) model, a first dataset including real-time system parameters for a legacy application, where the first dataset includes tabular data, and a second step 920 of determining, at the prediction ML model and based on sampled process times, an estimated time for execution of the data migration of the first dataset. A third step 930 includes determining, based on the estimated time and a given checkpoint duration, an estimated number of segments into which the first dataset can be segmented (or divided), where a segment refers to a discrete segment of the first dataset expected to migrate during the given checkpoint duration. In addition, a fourth step 940 includes determining, based on the number of segments, an estimated segment size for each segment, and a fifth step 950 includes determining a degree of data skew for each column (e.g., to enable ranking of the columns based on their data skew). Furthermore, the method 900 includes a sixth step 960 of selecting a first column associated with the smallest data skew as a segmentation column, a seventh step 970 of automatically generating a code that describes the estimated number of segments, the estimated segment size, and the selected first column, and an eighth step 980 of executing the data migration of the first dataset based on the generated code.

Figure 10:
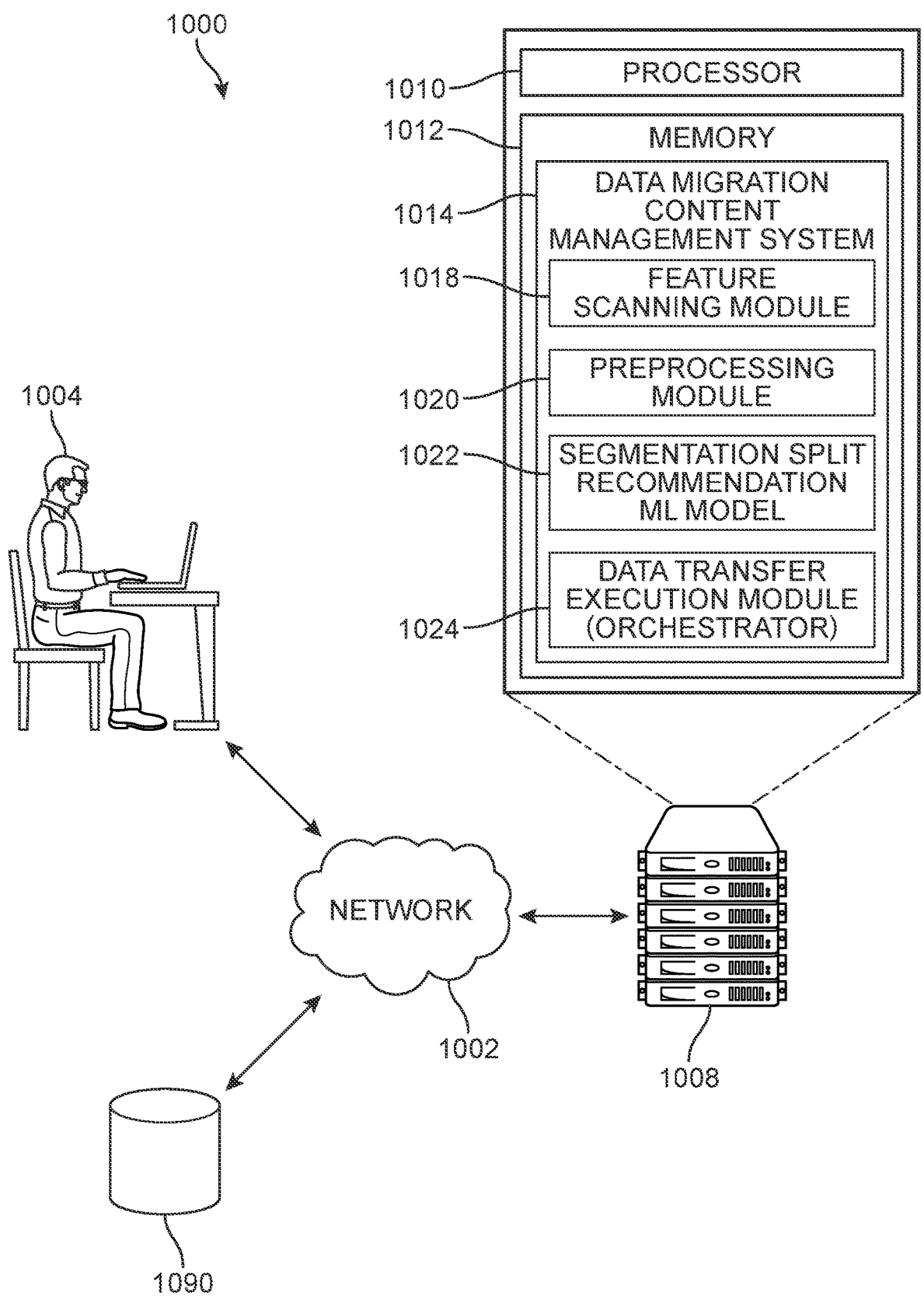
FIG. 10 is a diagram depicting example environments and components by which systems and/or methods, described herein, may be implemented.

In other embodiments, the method may include additional steps or aspects. In some embodiments, the method can include extracting a component feature set from the first dataset that identifies the tabular data. In another example, the method can also include automatically passing the code to an orchestrator and automatically executing, by the orchestrator, the data migration. In some embodiments, the method further includes receiving, at the orchestrator, a request to pause the data migration, pausing, at the orchestrator, the data migration until a request to resume the data migration has been received. In one embodiment, the method can also include training the prediction ML model using sample datasets that include labels for one or more of record counts, column names, and whether a column is encrypted. In some embodiments, the method may include adjusting the estimated time for execution based on whether the tabular data includes an encrypted column. In one example, the method can include employing, at the prediction ML model, a stochastic gradient descent technique to optimize model parameters and accelerate model learning FIG. 10 is a schematic diagram of an environment 1000 for a data migration content management system 1014 (system 1014), according to an embodiment. The environment 1000 may include a plurality of components capable of performing the disclosed methods. For example, environment 1000 includes a user device 1004, a computing/server system 1008, and a database 1090. The components of environment 1000 can communicate with each other through a network 1002. For example, user device 1004 may retrieve information from database 1090 via network 1002. In some embodiments, network 1002 may be a wide area network ("WAN"), e.g., the Internet. In other embodiments, network 1002 may be a local area network ("LAN").

As shown in FIG. 10, components of the system 1014 may be hosted in computing system 1008, which may have a memory 1012 and a processor 1010. Processor 1010 may include a single device processor located on a single device, or it may include multiple device processors located on one or more physical devices. Memory 1012 may include any type of storage, which may be physically located on one physical device, or on multiple physical devices. In some cases, computing system 1008 may comprise one or more servers that are used to host the system.

While FIG. 10 shows one user device, it is understood that one or more user devices may be used. For example, in some embodiments, the system may include two or three user devices. In some embodiments, the user device may be a computing device used by a user. For example, user device 1004 may include a smartphone or a tablet computer. In other examples, user device 1004 may include a laptop computer, a desktop computer, and/or another type of computing device. The user devices may be used for inputting, processing, and displaying information. Referring to FIG. 10, environment 1000 may further include database 1090, which stores training data, metadata, table data, classification data, attribute data, feedback data for iterative training of the ML models (training cycle), and/or other related data for the components of the system as well as other external components. This data may be retrieved by other components for system 1014. As discussed above, system 1014 may include a feature scanning and extraction module 1018, a preprocessing module 1020, a segmentation split recommendation model 1022, and a data transfer execution module 1024 (e.g., orchestrator). Each of these components may be used to perform the operations described herein.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons/options or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with the user interface, or other such information presentation.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of managing content during data migration, the method comprising:
   receiving, at a prediction machine learning (ML) model, a first dataset including real-time system parameters for a legacy application, the first dataset including tabular data;
   determining, at the prediction ML model and based on sampled process times, an estimated time for execution of the data migration of the first dataset;
   determining, based on the estimated time and a given checkpoint duration, an estimated number of segments into which the first dataset can be segmented, where a segment refers to a discrete segment of the first dataset expected to migrate during the given checkpoint duration;
   determining, based on the number of segments, an estimated segment size for each segment;
   determining a degree of data skew for each column;
   selecting a first column associated with the smallest data skew as a segmentation column;
   automatically generating a code that describes the estimated number of segments, the estimated segment size, and the selected first column; and
   executing the data migration of the first dataset based on the generated code.

2. The method of claim 1, further comprising extracting a component feature set from the first dataset that identifies the tabular data.

3. The method of claim 1, further comprising automatically passing the code to an orchestrator and automatically executing, by the orchestrator, the data migration.

4. The method of claim 3, further comprising:
   receiving, at the orchestrator, a request to pause the data migration; and
   pausing, at the orchestrator, the data migration until a request to resume the data migration has been received.

5. The method of claim 1, further comprising training the prediction ML model using sample datasets that include labels for one or more of record counts, column names, and whether a column is encrypted.

6. The method of claim 1, further comprising adjusting the estimated time for execution based on whether the tabular data includes an encrypted column.

7. The method of claim 1, further comprising employing, at the prediction ML model, a stochastic gradient descent technique to optimize model parameters and accelerate model learning.

8. A non-transitory computer-readable medium storing software comprising instructions executable by one or more computers which, upon such execution, cause the one or more computers to manage content during data migration by the following operations:
   receive, at a prediction machine learning (ML) model, a first dataset including real-time system parameters for a legacy application, the first dataset including tabular data;
   determine, at the prediction ML model and based on sampled process times, an estimated time for execution of the data migration of the first dataset;
   determine, based on the estimated time and a given checkpoint duration, an estimated number of segments into which the first dataset can be segmented, wherein a segment refers to a discrete segment of the first dataset expected to migrate during the given checkpoint duration;

determine, based on the number of segments, an estimated segment size for each segment;

determine a degree of data skew for each column;

select a first column associated with the smallest data skew as a segmentation column;

automatically generate a code that describes the estimated number of segments, the estimated segment size, and the selected first column; and execute the data migration of the first dataset based on the generated code.

9. The non-transitory computer-readable medium storing software of claim 8, wherein the instructions further cause the one or more computers to extract a component feature set from the first dataset that identifies the tabular data.

10. The non-transitory computer-readable medium storing software of claim 8, wherein the instructions further cause the one or more computers to automatically pass the code to an orchestrator and automatically execute, by the orchestrator, the data migration.

11. The non-transitory computer-readable medium storing software of claim 10, wherein the instructions further cause the one or more computers to:

receive, at the orchestrator, a request to pause the data migration; and pause, at the orchestrator, the data migration until a request to resume the data migration has been received.

12. The non-transitory computer-readable medium storing software of claim 8, wherein the instructions further cause the one or more computers to train the prediction ML model using sample datasets that include labels for one or more of record counts, column names, and whether a column is encrypted.

13. The non-transitory computer-readable medium storing software of claim 8, wherein the instructions further cause the one or more computers to adjust the estimated time for execution based on whether the tabular data includes an encrypted column.

14. The non-transitory computer-readable medium storing software of claim 8, wherein the instructions further cause the one or more computers to employ, at the prediction ML model, a stochastic gradient descent technique to optimize model parameters and accelerate model learning.

15. A system for managing content during data migration comprising one or more computers and one or more storage devices storing instructions that are operable, when executed by the one or more computers, to cause the one or more computers to:

receive, at a prediction machine learning (ML) model, a first dataset including real-time system parameters for a legacy application, the first dataset including tabular data;

determine, at the prediction ML model and based on sampled process times, an estimated time for execution of the data migration of the first dataset;

determine, based on the estimated time and a given checkpoint duration, an estimated number of segments into which the first dataset can be segmented, wherein a segment refers to a discrete segment of the first dataset expected to migrate during the given checkpoint duration;

determine, based on the number of segments, an estimated segment size for each segment;

determine a degree of data skew for each column;

select a first column associated with the smallest data skew as a segmentation column;

automatically generate a code that describes the estimated number of segments, the estimated segment size, and the selected first column; and execute the data migration of the first dataset based on the generated code.

16. The system of claim 15, wherein the instructions further cause the one or more computers to extract a component feature set from the first dataset that identifies the tabular data.

17. The system of claim 15, wherein the instructions further cause the one or more computers to automatically pass the code to an orchestrator and automatically execute, by the orchestrator, the data migration.

18. The system of claim 17, wherein the instructions further cause the one or more computers to:

receive, at the orchestrator, a request to pause the data migration; and pause, at the orchestrator, the data migration until a request to resume the data migration has been received.

19. The system of claim 15, wherein the instructions further cause the one or more computers to train the prediction ML model using sample datasets that include labels for one or more of record counts, column names, and whether a column is encrypted.

20. The system of claim 15, wherein the instructions further cause the one or more computers to adjust the estimated time for execution based on whether the tabular data includes an encrypted column.

* * * * *